Jan. 6, 1925.　　　　　　　　　　　　　　　　1,522,003
H. R. EYERLY
LOADING DEVICE
Filed April 23, 1923　　　2 Sheets-Sheet 1
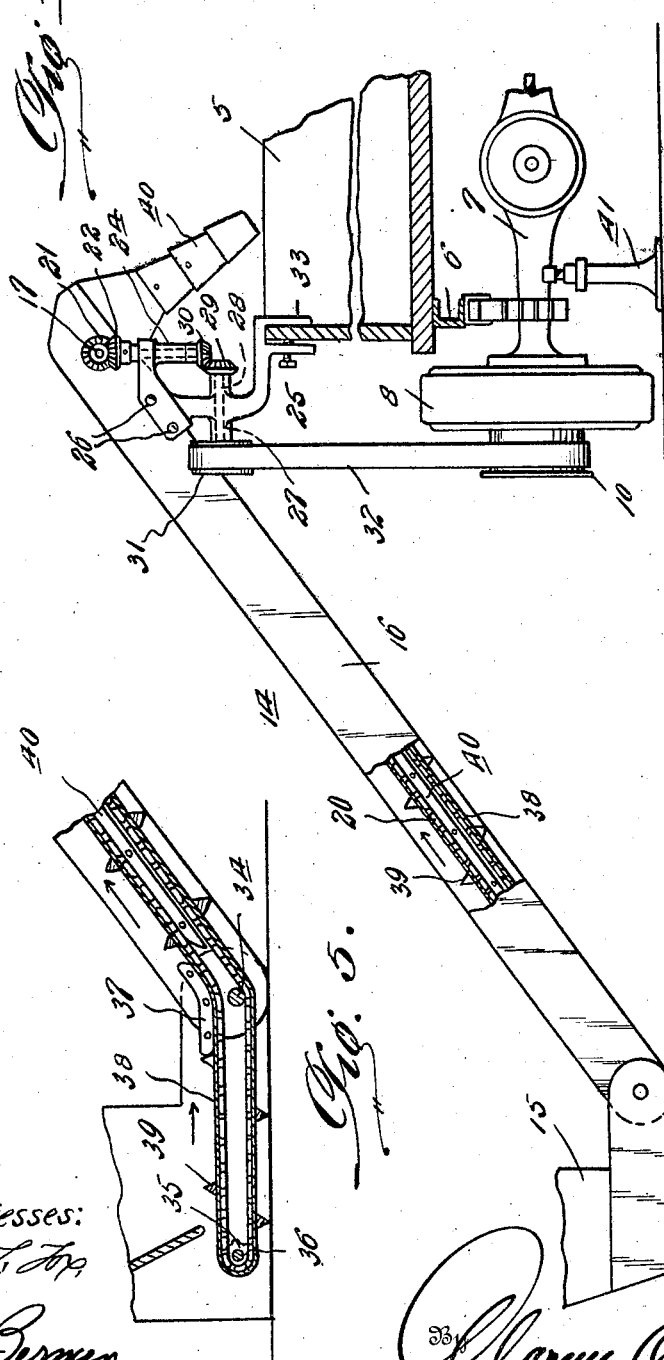
Howard R. Eyerly,
Inventor Jan. 6, 1925. 1,522,003
H. R. EYERLY
LOADING DEVICE
Filed April 23, 1923  2 Sheets-Sheet 2
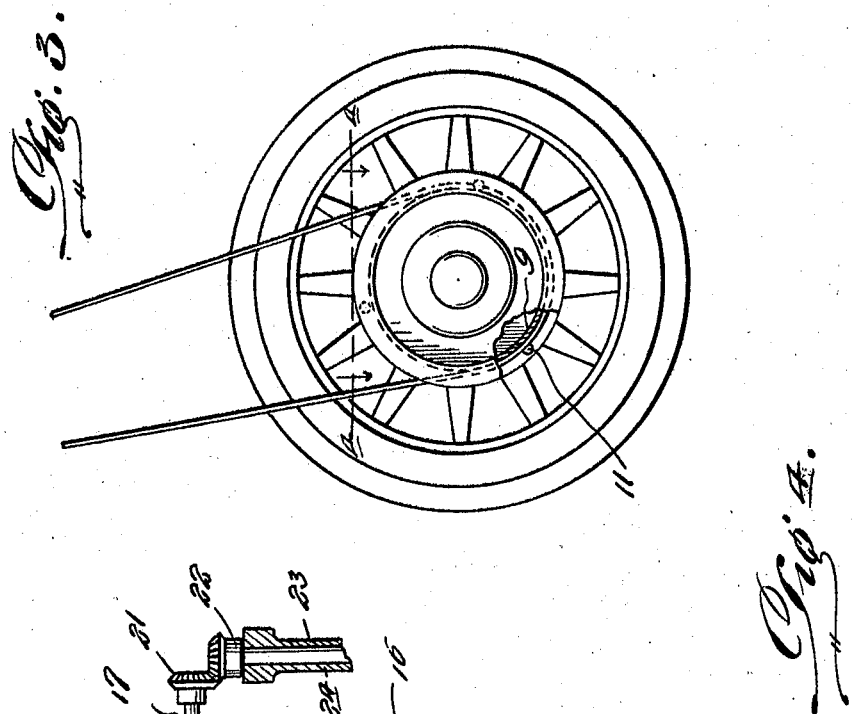
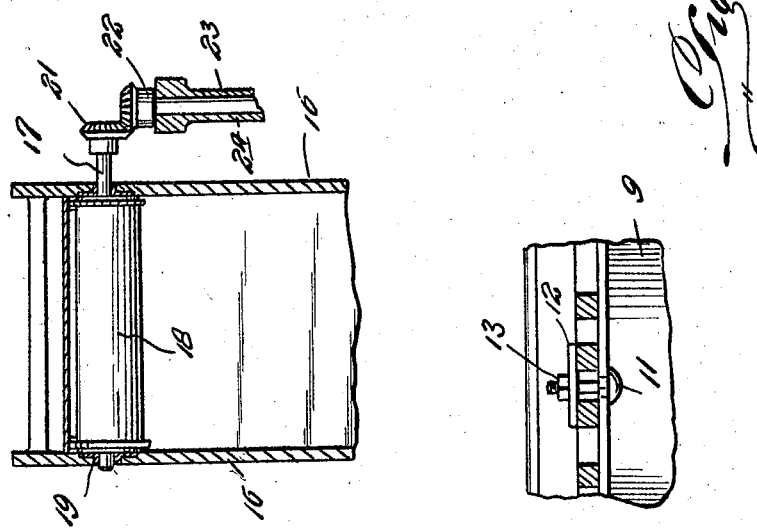
Howard R. Eyerly.
Inventor Patented Jan. 6, 1925.

1,522,003

UNITED STATES PATENT OFFICE.

HOWARD R. EYERLY, OF WINTERSET, IOWA.

LOADING DEVICE.

Application filed April 23, 1923. Serial No. 633,869.

*To all whom it may concern:*

Be it known that I, HOWARD R. EYERLY, a citizen of the United States, residing at Winterset, in the county of Madison and State of Iowa, have invented certain new and useful Improvements in Loading Devices, of which the following is a specification.

In carrying out the present invention, it is my purpose to provide a loading device adapted for employment in conjunction with motor vehicle trucks for facilitating the expeditious loading of the trucks.

A further purpose of the invention is the provision of a loading device for motor trucks, wherein the same is operated by the power of the truck.

A still further purpose of the invention is to provide a loading device that is comparatively simple of construction, and one that may be associated with or detached from the truck in a minimum amount of time, the device embracing at the same time the desired features of efficiency and durability.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein:

Figure 1 is a side elevation of my improved loading device, the same being shown attached to a motor vehicle truck.

Figure 2 is an enlarged detail fragmentary cross sectional view of the upper end of my loading device.

Figure 3 is a side elevation of one of the truck driving wheels equipped with a pulley, whereby power is taken from the vehicle, through the medium of a drive belt, between this pulley and the pulley of my loading device, it being of course understood that it is necessary that the rear end of the truck be jacked up when the loading device is in operation.

Figure 4 is a fragmentary cross section upon the line 4—4 of Figure 3, and

Figure 5 is a cross sectional view of the lower end of my loading device.

Referring to the drawings in detail, and particularly to Figure 1, there is fragmentarily shown a motor vehicle truck, that comprises the usual box 5 upon the frame 6, as well as the rear axle 7 and driving wheel 8. These elements form no part of my invention, as the same are well-known, and are merely shown for more adequately disclosing the relationship of my invention therewith.

Upon the outer side of either one of the driving wheels of said truck, there is positioned a belt pulley 9, flanged at its opposite ends at 10, one of which is provided with spaced openings for permitting of the passage therethrough of bolts 11, these bolts adapted for engagement between adjacent spokes, and have positioned over their inner ends, washers 12 that contact with the spokes, and are maintained in such a position by nuts 13 upon the usual screw threaded ends of the bolts.

My loading device comprises an elevator designated generally by the numeral 14, and a hopper 15 pivotally secured to the lower end of the elevator. The elevator includes a metallic casing 16, provided with a cross shaft 17, adjacent its upper end, this cross shaft being journaled within openings in the side walls of said casing. The shaft carries a drum 18, that is formed with sprocket gears 19 at its opposite ends, which have trained thereover, endless sprocket chains 20. One end of this shaft 17 extends outwardly of the elevator casing, and has keyed thereto, a bevelled gear 21 that is in mesh with a similar gear 22 upon the upper end of a stub shaft 23, which is journaled within a bearing sleeve 24, pendently formed upon the upper end of an elevator supporting arm designated generally at 25. This arm 25 is secured to the elevator casing at 26, and is further formed with a transverse shaft bearing 27, through which extends a shaft 28 carrying a bevelled gear 29 at one end that intermeshes with a bevelled gear 30, upon the lower end of said stub shaft 23. The opposite end of the shaft 28 carries a belt pulley 31, over which there is adapted to be positioned a drive belt 32, after the loading device has been associated with the truck, it being of course understood that this belt 32 is also engaged over the pulley 10 of the truck wheel 8. The lower end of the supporting arm 25 terminates in a desirable form of clamp 33, that engages over the adjacent side wall of a truck box 5.

The sprocket chains 20 extend downwardly within the elevator casing 16, the lower sides thereof being extended beneath a cross rod 34, that provides the pivotal connection between the elevator 14 and hopper 15. These chains are then extended over sprockets 35 upon the ends of a cross shaft 36, within said hopper 15, it being noted that portions of the chains within said hopper extend parallel with the longitudinal axis of said hopper, this being occasioned through the medium of the said cross rod 34, as well as curved bracket plates 37 upon opposite sides of the lower end of the elevator casing 16 and directly above said chains 20.

The chains 20 carry an endless canvas belt 38, that is provided on its outer surface with spaced cross strips 39 for obvious purposes. For preventing the top sides of the chains 20 from sagging the side walls of the casing 16 are provided with metallic strips 40, beneath said chains as more clearly shown in Figures 1 and 5.

The upper end of the elevator may be and preferably is provided with an outlet nozzle 41 of the flexible type, whereby the material may be directed as desired, in the truck box 5.

It is of course essential that the wheel of the truck that carries the belt pulley 10 be supported above the ground surface and for this purpose, a suitable form of jack 41 may be employed, and in view of the above description, it will at once be understood that when my loading device is associated with a truck as shown in Figure 1, and when power is applied to the wheel through the usual motor, the material that is fed into the hopper 15 is directed upwardly through the medium of the conveyor into the wagon box in a simple and expeditious manner.

Numerous advantages of a loading device of this character will be readily appreciated by those skilled in the art, and even though I have shown and described the preferred embodiment of the present invention, it is nevertheless to be understood that minor changes may be made therein, without departing from the spirit and scope of the invention as claimed.

Having thus described my invention, what I claim as new, and desire to secure by Letters-Patent, is:

Loading apparatus comprising a casing adapted to be disposed in an inclined position, a hopper pivotally connected with the lower end of the casing and adapted to be disposed in a horizontal position, belt moving members journalled at the outer ends of the casing and the hopper, a cross rod disposed transversely of the casing and the hopper at the pivoted ends thereof, and lying between the upper and lower edges of the casing and the hopper, said rod serving as the pivot between the hopper and the casing, a belt trained around the belt moving means and traversing the length of the casing and the hopper, the lower run of the belt being disposed below the said cross rod, and guide plates applied to the sides of the casing and bearing upon the upper run of the belt above the points of pivotal connection between the casing and the hopper, said guide plates disposed transversely of said rod, said guide plates having angularly disposed end portions, the opposite ends of the guide plate being disposed in the casing and the hopper respectively, the intermediate portions of the guide plate being spaced from the rod and the opposite ends of the guide plates being disposed beyond the opposite sides of the rod.

In testimony whereof I affix my signature.

HOWARD R. EYERLY.